(12) United States Patent
Kim et al.

(10) Patent No.: US 8,214,861 B2
(45) Date of Patent: Jul. 3, 2012

(54) SYSTEM AND METHOD FOR PROVIDING VIDEO ON DEMAND PREVIEW CHANNEL THROUGH CHANNEL ZAPPING IN REAL-TIME BROADCAST SERVICE

(75) Inventors: Chang Ho Kim, Seoul (KR); Yeon Hwah Chung, Gyeonggi-do (KR); Ui Yong Shim, Seoul (KR); Seung Ha Lee, Seoul (KR)

(73) Assignee: Broadband Media Co., Ltd., Seoul (KR)

( * ) Notice: Subject to any disclaimer, the term of this patent is extended or adjusted under 35 U.S.C. 154(b) by 502 days.

(21) Appl. No.: 12/553,229

(22) Filed: Sep. 3, 2009

(65) Prior Publication Data

US 2010/0306806 A1     Dec. 2, 2010

(30) Foreign Application Priority Data

May 27, 2009   (KR) .................. 10-2009-0046319

(51) Int. Cl.
| | |
|---|---|
| *G06F 3/00* | (2006.01) |
| *G06F 13/00* | (2006.01) |
| *H04N 5/445* | (2011.01) |
| *H04N 7/10* | (2006.01) |
| *H04N 7/025* | (2006.01) |
| *H04N 7/173* | (2006.01) |

(52) U.S. Cl. ................ 725/61; 725/32; 725/38; 725/87
(58) Field of Classification Search .................. 725/32, 725/38, 61, 87
See application file for complete search history.

(56) References Cited

U.S. PATENT DOCUMENTS

| | | | | |
|---|---|---|---|---|
| 5,721,829 A | * | 2/1998 | Dunn et al. ............... | 725/87 |
| 5,752,160 A | * | 5/1998 | Dunn .......................... | 725/93 |
| 2004/0205816 A1 | * | 10/2004 | Barrett ....................... | 725/49 |

FOREIGN PATENT DOCUMENTS

| | | |
|---|---|---|
| KR | 1020040089566 A | 10/2004 |
| KR | 1020070056189 A | 6/2007 |

* cited by examiner

*Primary Examiner* — Dominic D Saltarelli
(74) *Attorney, Agent, or Firm* — Scully, Scott, Murphy & Presser, P.C.

(57) ABSTRACT

Disclosed is a system and a method of providing a VOD (Video On Demand; below referred to as 'VOD') preview channel through channel zapping in a real-time broadcast service. To do this, the present invention includes a VOD preview channel for a VOD service between real-time broadcast channels, and allows a user to view a VOD screen as well as a real-time channel through channel zapping. As a VOD screen, a playing screen for playing a pre-downloaded VOD preview content for the corresponding VOD preview channel is displayed, and the corresponding VOD can be watched through such functions as an initial viewing and a continuous viewing if a viewing on the screen is wanted.

23 Claims, 5 Drawing Sheets

| | Zapping Preview DTD Structure |
|---|---|
| 1 | `<!ELEMENT Zapping Preview (Channel Number*)>`<br>`<!ELEMENT Channel Number (Content ID *)>`<br>`<!ATTLIST Channel Number`<br>  CHANNEL NAME CDATA #REQUIRED<br>  NUMBER OF CONTENTS WITHIN CHANNEL CDATA #REQUIRED<br>  CHANNEL START DATE CDATA #REQUIRED<br>  CHANNEL END DATE CDATA #REQUIRED<br>  CHANNEL START TIME CDATA #REQUIRED<br>  CHANNEL END TIME CDATA #REQUIRED<br>  CHANNEL IMAGE CDATA #IMPLIED<br>  CHANNEL VIEWING RATE CDATA # REQUIRED<br>  USE OR NON-USE OF CHANNEL NUMBER (Y\|N) "N"<br>  USE OR NON-USE OF CHANNEL NAME (Y\|N) "N"<br>  GENRE CDATA #REQUIRED<br>  CUG INFORMATION CDATA #REQUIRED><br>`<!ELEMENT Content ID (#PCDATA)>`<br>`<!ATTLIST Content ID`<br>  CONTENT NAME CDATA #REQUIRED<br>  CONTENT START DATE CDATA #REQUIRED<br>  CONTENT END DATE CDATA #REQUIRED<br>  CONTENT START TIME CDATA #REQUIRED<br>  CONTENT END TIME CDATA #REQUIRED<br>  CONTENT POSTER CDATA #IMPLIED<br>  CONTENT VIEWING GRADE CDATA #REQUIRED<br>  CONTENT PREDOWNLOAD START TIME CDATA #REQUIRED<br>  SCENARIO (1\|2\|3\|4) "1"<br>  CONTENT PREDOWNLOAD START TIME-POINT CDATA #REQUIRED<br>  CONTENT PREDOWNLOAD END TIME-POINT CDATA #REQUIRED<br>  GENRE CDATA #REQUIRED<br>  CONTENT INFORMATION CDATA # REQUIRED<br>  CONTENT DIRECTOR CDATA # REQUIRED<br>  CONTENT ACTOR/ACTRESS CDATA # REQUIRED<br>  CONTENT SERIES INFORMATION CDATA # IMPLIED<br>  CONTENT RUNNING TIME CDATA # REQUIRED<br>  CONTENT IMAGE (HD\|SD) "SD"<br>  CONTENT SOUND CDATA # REQUIRED<br>  CONTENT PRICE CDATA # REQUIRED<br>  CONTENT BROADCAST DATE CDATA # REQUIRED<br>  CONTENT EVALUATION MARK CDATA # REQUIRED<br>  CUG INFORMATION CDATA #REQUIRED> |

SYSTEM AND METHOD FOR PROVIDING VIDEO ON DEMAND PREVIEW CHANNEL THROUGH CHANNEL ZAPPING IN REAL-TIME BROADCAST SERVICE

BACKGROUND OF THE INVENTION

1. Field of the Invention

The present invention relates to a real-time broadcasting service, and more particularly to a system and a method for providing a VOD preview channel used for viewing VOD (Video On Demand, hereinafter referred to as 'VOD') as well as a real-time broadcast channel when a user zaps channels during a real-time broadcast service.

2. Description of the Prior Art

Currently, a Digital Cable (CATV) service or an IPTV service, that is a real-time broadcast service, provides a real-time broadcast service as well as a VOD service. To view the real-time broadcast and the VOD, a user has to click on a button of a remote control which is separately provided for selecting such a real-time broadcast or a VOD.

In the case of the real-time broadcast among such services, it is possible to easily view a desired broadcast channel through real-time broadcast channel zapping or a number input by the remote control.

However, in order to view the VOD, a user has to enter a separately configured VOD menu and select the title of the VOD, a serial number of the VOD, etc.

As such, the provision of the VOD service requires the undergoing of several steps in selecting a VOD intended to view, which is inconvenient and takes a long time. Thus, it is not easy to find and view a desired VOD one by one.

Also, since a user can feel like real-time broadcast and the VOD are separated temporally/spatially, most users, not being a VOD mania or a user desiring to watch a VOD necessarily, tend to use a real-time channel which has good accessibility, resulting in affecting the amount of actual VOD use.

SUMMARY OF THE INVENTION

Accordingly, the present invention has been made to solve the above-mentioned problems occurring in the prior art, and an object of the present invention is to provide a broadcast system and a method of providing a VOD preview channel to view a VOD easily without a user undergoing several steps in order to watch the VOD.

Also, another object of the present invention is to provide a broadcast system and a method of providing a real-time broadcast channel as well as a VOD preview channel for VOD viewing when a user zaps through channels in order to cause the user to feel like the real-time broadcast and VOD are unseparated temporally/spatially.

To accomplish the above and objects, in accordance with one aspect of the present invention, there is provided a system of providing a VOD (Video On Demand) preview channel through channel zapping in a real-time broadcast service, comprising: a content management server (CMS) for assigning a plurality of VOD preview channels between real-time channels and registering and managing VOD preview channel information and at least one VOD content information contained in the VOD preview channel, the plurality of VOD preview channels providing VOD previews; a VOD preview information providing server for providing the VOD preview information to a set-top box; and the set-top box for providing a real-time channel or the VOD preview channel according to channel zapping, wherein the VOD preview channel plays the original VOD contents to VOD preview contents according to playing of VOD preview contents for VOD contents allocated to the channels and a user's selection, and the VOD preview content is a content where some portion of the original VOD content is compiled.

And, according to the embodiment of present invention, the set-top box provides a real-time channel or the VOD preview channel according to the input of a channel number or a selection of menus.

And, according to the embodiment of present invention, the VOD preview channels are classified according to a genre or a theme, and each of the VOD preview channels classified according to the genre or the theme is placed behind a similar kind of real-time broadcast channel.

And, according to the embodiment of present invention, the set-top box plays a downloaded VOD preview content if one VOD preview content corresponding to the selected VOD preview channel has been downloaded, and the set-top box selects and plays one VOD preview content in a random way if two or more of them have been downloaded.

And, according to the embodiment of present invention, the set-top box zaps to the next channel if there is no VOD preview content because a VOD preview content corresponding to the selected VOD preview channel has not been downloaded in advance.

And, according to the embodiment of present invention, the set-top box plays only the VOD preview content which is not limited by viewing restriction when playing the VOD preview contents.

And, according to the embodiment of present invention, the set-top box plays the VOD preview contents for a predefined time, displays a view inducing pop-up for inducing a viewing on a part of a screen when the predefined time has expired, and downloads and plays the original VOD contents to the played VOD preview contents if there is a viewing selection from a user.

And, according to the embodiment of present invention, the view inducing pop-up displays at least one of an initial viewing button for viewing from first sees, a continued viewing button displayed with a guide phrase for inducing continuous viewing of the played VOD preview contents and a cancel button.

And, according to the embodiment of present invention, the set-top box downloads the original VOD contents to the played VOD preview contents and played it at initial time when the initial viewing is selected from the displayed view inducing pop-up, and the set-top box downloads the original VOD contents to the played VOD preview contents and plays it continuously from the play finished time when a continuous viewing is selected.

And, according to the embodiment of present invention, wherein, if a cancel button is input after the view inducing pop-up is displayed or if there is no selection within a predefined time, the set-top box checks whether there are other pre-downloaded VOD preview contents corresponding to the selected VOD preview channel, and, if there are other pre-downloaded VOD preview contents, the set-top box plays the VOD preview contents according to the contents playing method.

And, according to the embodiment of present invention, the set-top box zaps to the next channel when there is no pre-downloaded VOD preview content as a result of checking on whether there are other pre-downloaded VOD preview contents corresponding to the selected VOD preview channel.

And, according to the embodiment of present invention, the VOD preview channel information includes at least one of: the number and the name of a channel used as a VOD preview channel in real-time channels; VOD content information of each channel; the number of contents within a channel; the start date and the end date of the channel; the start time and the end time of the channel; a channel image; a channel viewing rate; use or non-use of the channel number; use or non-use of the channel name; respective channel genre information; and CUG information.

And, according to the embodiment of present invention, the VOD content information includes at least one of: contents ID information; the name of contents; the start date and the end date of contents; the start time and the end time of contents; a content poster; a contents viewing rate (a viewing age restricting rate); the start time of contents downloading; scenario settings; the start time-point and the end time-point of contents downloading; genres; contents detail information; a content director; a content actor/actress; content series information; the running time of contents; a content image; a content sound; a content price; a content broadcast date; a content evaluation mark; and CUG information.

In accordance with another aspect of the present invention, there is provided a method for providing a VOD (Video On Demand) preview channel through channel zapping in a real-time broadcast service. The method includes the steps of: (1) pre-downloading a VOD preview contents using VOD preview channel information and VOD preview information including at least one VOD (Video On Demand) content information contained in the VOD preview channel; (2) checking whether a selected channel according to a key input from a user for channel zapping is a VOD preview channel; (3) checking whether there is a pre-downloaded VOD preview content which corresponds to the selected channel or not, when the selected channel is a VOD preview channel as the checking result of the second step; and (4) playing the corresponding VOD preview content and displaying it on a screen if there is a pre-downloaded VOD preview content which corresponds to the selected channel.

And, according to the embodiment of present invention, the method further comprises the step of, after performing step (2), displaying the selected real-time broadcast channel on the screen if the selected channel is a real-time broadcast channel.

And, according to the embodiment of present invention, in step (4), one of the pre-downloaded VOD preview contents is selected in a random way and played, and is then displayed on the screen.

And, according to the embodiment of present invention, the method further comprises the step of, after performing step (3), zapping to the next channel if there is no pre-downloaded VOD preview content.

And, according to the embodiment of present invention, in step (4), only a viewing-unrestricted VOD preview content is played when the VOD preview content exists and is played.

And, according to the embodiment of present invention, the method further comprises the steps of: (5) playing the VOD preview contents for a predefined time and displaying a view inducing pop-up for inducing a viewing on a part of the screen when the predefined time has expired; and (6) downloading and playing the original VOD contents to the played VOD preview contents if there is a viewing selection from a user.

And, according to the embodiment of present invention, the view inducing pop-up displays at least one of an initial viewing button for viewing from first sees, a continued viewing button displayed with a guide phrase for inducing continuous viewing of the played VOD preview contents and a cancel button.

And, according to the embodiment of present invention, the method further comprises the step of: (7) downloading the original VOD contents to the played VOD preview contents and played it at initial time when an initial viewing is selected from the displayed view inducing pop-up, and, when a continuous viewing is selected, the set-top box downloads the original VOD contents to the played VOD preview contents and playing it continuously from the play finished time.

And, according to the embodiment of present invention, the method further comprises the steps of: (8) checking whether there are other pre-downloaded VOD preview contents corresponding to the selected VOD preview channel if a cancel button is input after the view inducing pop-up is displayed, or there is no selection within a predefined time; and (9) playing the VOD preview contents according to the contents playing method if there are other pre-downloaded VOD preview contents.

And, according to the embodiment of present invention, the method further comprises the step of: (10) zapping to the next channel if there is no pre-downloaded VOD preview content, after performing step (8).

And, according to the embodiment of present invention, the VOD preview channel information includes at least one of: the number and the name of a channel used as a VOD preview channel in real-time channels; VOD content information of each channel; the number of contents within a channel; the start date and the end date of the channel; the start time and the end time of the channel; a channel image; a channel viewing rate; use or non-use of the channel number; use or non-use of the channel name; respective channel genre information; and CUG information.

And, according to the embodiment of present invention, the VOD content information includes at least one of: contents ID information; the name of contents; the start date and the end date of contents; the start time and the end time of contents; a content poster; a contents viewing rate (a viewing age restricting rate); the start time of contents downloading; scenario settings; the start time-point and the end time-point of contents downloading; genres; contents detail information; a content director; a content actor/actress; content series information; the running time of contents; a content image; a content sound; content price; a content broadcast date; a content evaluation mark; and CUG information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description and drawings, the same reference numerals are used to designate the same or similar components. In the following description, specific items will be provided to facilitate the general understanding of the present invention. Further, a detailed description of known functions and configurations incorporated herein will be omitted when it may make the subject matter of the present invention rather clear.

In the following, a solution for presenting a VOD preview channel, which helps watching a VOD, and a real-time broadcast channel through a channel zapping or a channel number input according to an embodiment of the present invention will be described with reference to accompanying drawings. Herein, the VOD preview channel refers to a channel for providing one or more VOD preview contents, and the VOD preview channel can be implemented as a plurality of channels according to the provider's settings. Also, the VOD preview contents may be the contents where some portion of its original VOD contents is compiled.

Figure 1:
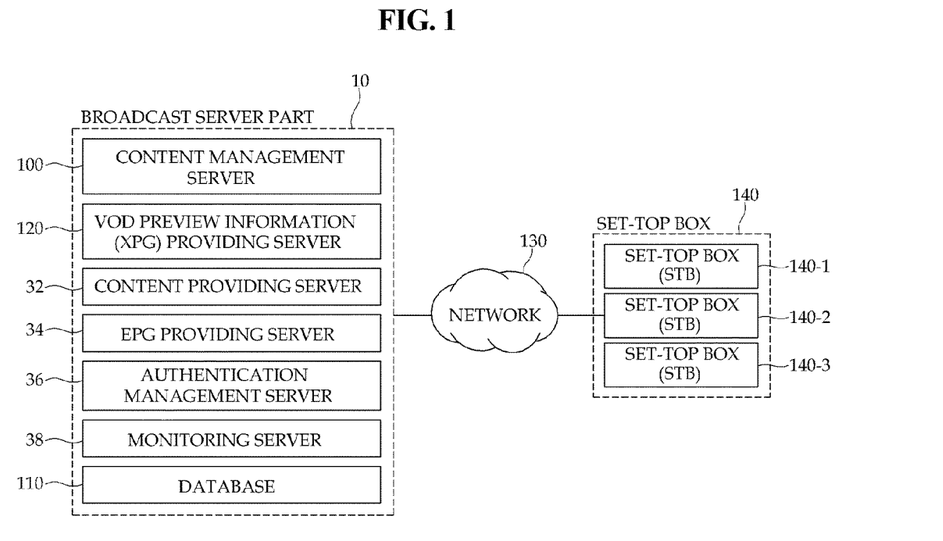
FIG. 1 shows the configuration of a broadcast service network according to an embodiment of the present invention.

First, the configuration of a broadcast service network according to an embodiment of the present invention will be described with reference to FIG. 1.

A broadcast service according to the present invention can be mainly implemented through a broadcast server part 10 on a server side, a network 130, and a set-top box on a user side 140.

A broadcast server part 10 includes a content management server (CMS), a VOD preview information (XPG: EXtensible Program Guide) providing server 120, a content providing server 32, an EPG (Electronic Program Guide) providing server 34, an authentication management server 36, a monitoring server 38, and a database 110.

Herein, in the case of the broadcast server part 10 illustrated in the drawing, independent functions are constructed within a single broadcast server for the convenience of the description. However, one or more servers may have those functions incorporated together, and if necessary, it is possible to add servers for providing various functions to the illustrated servers.

The content management server (CMS) 100 of the broadcast server part 10 registers and manages VOD preview channel information including at least one piece of VOD preview information and at least one piece of VOD content information corresponding to the VOD preview channel.

Herein, the VOD preview channel information includes at least one of: the number and the name of a channel used as a VOD preview channel in real-time channels; VOD content information of each channel; the number of contents within a channel; the start date and the end date of the channel; the start time and the end time of the channel; a channel image; a channel viewing rate; the use or not of the channel number; the use or non-use of the channel name; respective channel genre information; and CUG information.

Also, VOD content information includes at least one of: contents ID information; the name of contents; the start date and the end date of contents; the start time and the end time of contents; a content poster; a contents viewing rate (a viewing age restricting rate); the start time of contents downloading; scenario settings; the start time-point and the end time-point of contents downloading; genres; contents detail information; a content director; a content actor/actress; content series information; the running time of contents; a content image; content sound; content price; a content broadcast date; a content evaluation score; and CUG information.

The content management server (CMS) 100 arranges a VOD channel between real-time channels, wherein VOD contents contained in the VOD channel is arranged between channels of similar genres so that a user can feel as if the VOD preview channel were a real-time channel.

Also, the content management server 100 classifies the VOD preview channels according to their genre so as to enable random play of the preview, and enables an operator to set each contents as contents played from the beginning or contents played from a middle point. Here, the middle point may be a highlight part of contents, or it may be a point such as 30% and 50% points starting from a portion randomly chosen from a medium portion. The content management server 100 may include a database for storing VOD preview information, and it may additionally include an external database 10 to store VOD preview information in the external database 10 as shown in FIG. 1.

The VOD preview information (XPG: Extensible Program Guide) providing server 120 receives VOD preview information from the content management server 100, generates the form which is transmitted to the set-top box 140, and provides it to the set-top box 140.

Figure 4:
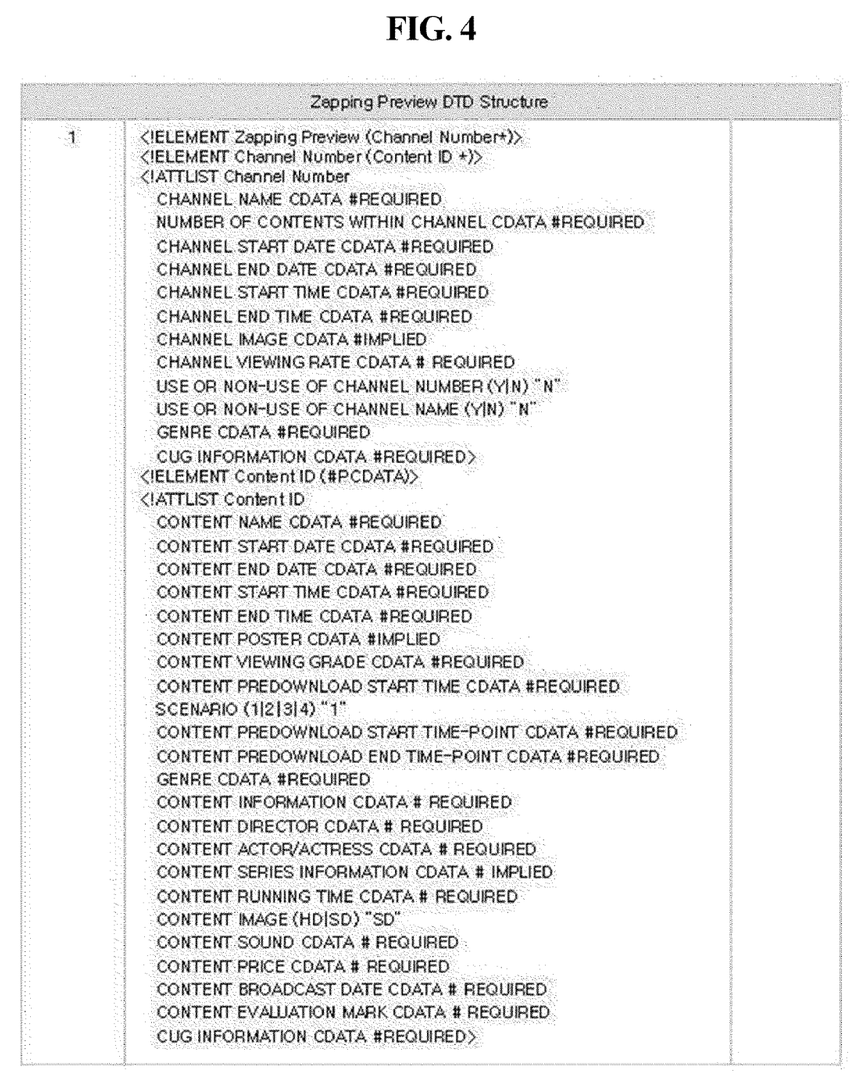
FIG. 4 shows the structure of a zapping preview DTD (Document Type Definition) containing VOD preview information according to an embodiment of the present invention.

Here, it is preferred that the VOD preview information is generated in the format of XML (eXtensible Markup Language), and the VOD preview DTD (Document Type Definition) may have a structure as shown in FIG. 4.

The content providing server 32 includes a database for storing various VOD contents, and provides contents to the user side via the network 130 when there is a user's request. Naturally, it can store VOD contents in the external database 110, rather than including a database within itself.

In some cases, the content providing server 32 may include multiple content supplying servers in its lower side, so as to store and manage content data in each content supplying server. In this case, the content providing server 32 collectively manages content supplying servers and a content list stored within them.

The EPG providing server 34 generates EPG (Electronic Programming Guide) information for VOD contents provided by the content providing server 32 and provides it for a user terminal (for instance, a set-top box 140).

The authentication management server 36 stores and manages basic information of each member subscribed to a certain broadcast service (for example, personal data, ID, password and contact address) and authenticates if he or she is a registered user when utilizing the service. To do this, the authentication management server 36 requests an ID of each user or assigns an ID to each user when a user subscribes to the broadcast service.

The monitoring server 38 monitors the system operation of the broadcast server part 10, and also monitors whether a user is utilizing the service, or what the user is viewing, or what he has requested.

The network 130 includes a wired/wireless communication network to enable the network.

The multiple of set-top box 140-1, 140-2 and 140-3 accesses the broadcast server part 10 via the network 130, requests the content providing server 32 of contents selected by the user, and outputs the contents being downloaded according to the request via a displaying screen (not shown). Further, the set-top box 140 guides a menu screen for the user by receiving EPG information from the EPG providing server 34 and outputting it through the displaying screen 40.

The displaying screen connected to the set-top box 10 may be a television receiver or a monitor, and it may include a personal digital assistant. In the case of the personal digital assistant, any data are transmitted/received via a mobile communication network or a wired network.

Figure 2:
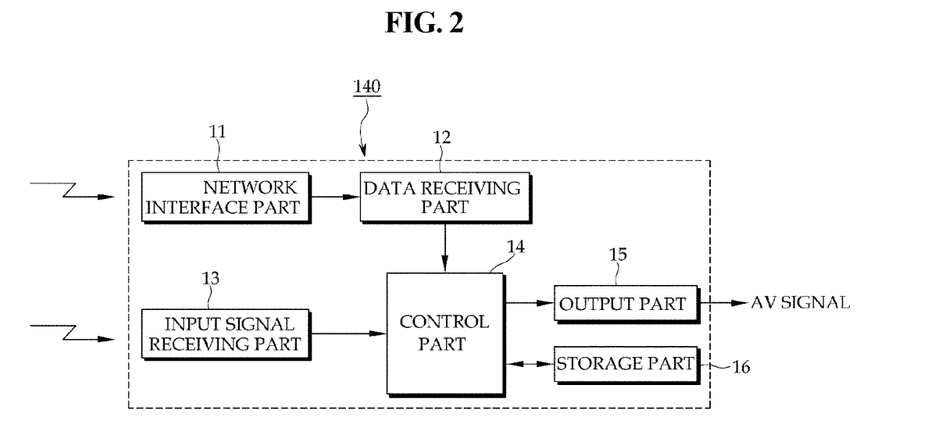
FIG. 2 shows in detail the construction of a set-top box according to an embodiment of the present invention.

Next, the internal construction of a set-top box 140 according to an embodiment of the present invention will be described in detail with reference to FIG. 2. FIG. 2 shows in detail the construction of a set-top box 140 according to an embodiment of the present invention.

Referring to FIG. 2, a set-top box 140 according to an embodiment of the present invention includes a network interface part 11, a data receiving part 12, an input signal receiving part 13, a control part 14, an output part 15 and a storage part 16.

The network interface part 11 accesses the broadcast server part 10 via the network 130 for data communication.

The data receiving part 12 decodes and processes data received through the network interface part 11.

The input signal receiving part 13 receives a signal input by a user through an input means such as a remote controller and provides it to the control part 14.

The storage part 16 stores a related control program to provide a broadcast service, and stores data provided through the network interface 11 (for instance, VOD preview information, contents data and EPG information).

The output part 15 converts and outputs content data, which is output through the control part 14, into an audio/video (AV) signal to display the content data on the displaying screen.

The control part 14 controls the general operation of the set-top box 140.

Particularly, the control part 14 according to an embodiment of the present invention receives VOD preview information from the VOD preview information providing server 120, and pre-downloads VOD preview contents using the VOD preview channel information and VOD content information contained in the VOD preview information. Also, when a channel selected for channel zapping is the VOD preview channel, one of the corresponding VOD preview contents is played in a random way according to whether pre-downloaded VOD preview contents corresponding to the selected channel exist or not.

Also, the control part 14 deletes VOD preview contents in the storage part 16 when the end date of the VOD preview contents and that of the channel corresponding to the VOD preview contents elapse, by using the VOD preview information.

Also, the control part 14 records viewing details according to watching VOD preview contents through a VOD preview channel. The recorded viewing details can be used during a later viewing rate research.

Hereinafter, an operation of the control part 14 will be described in detail with reference to FIG. 3.

Figure 3:
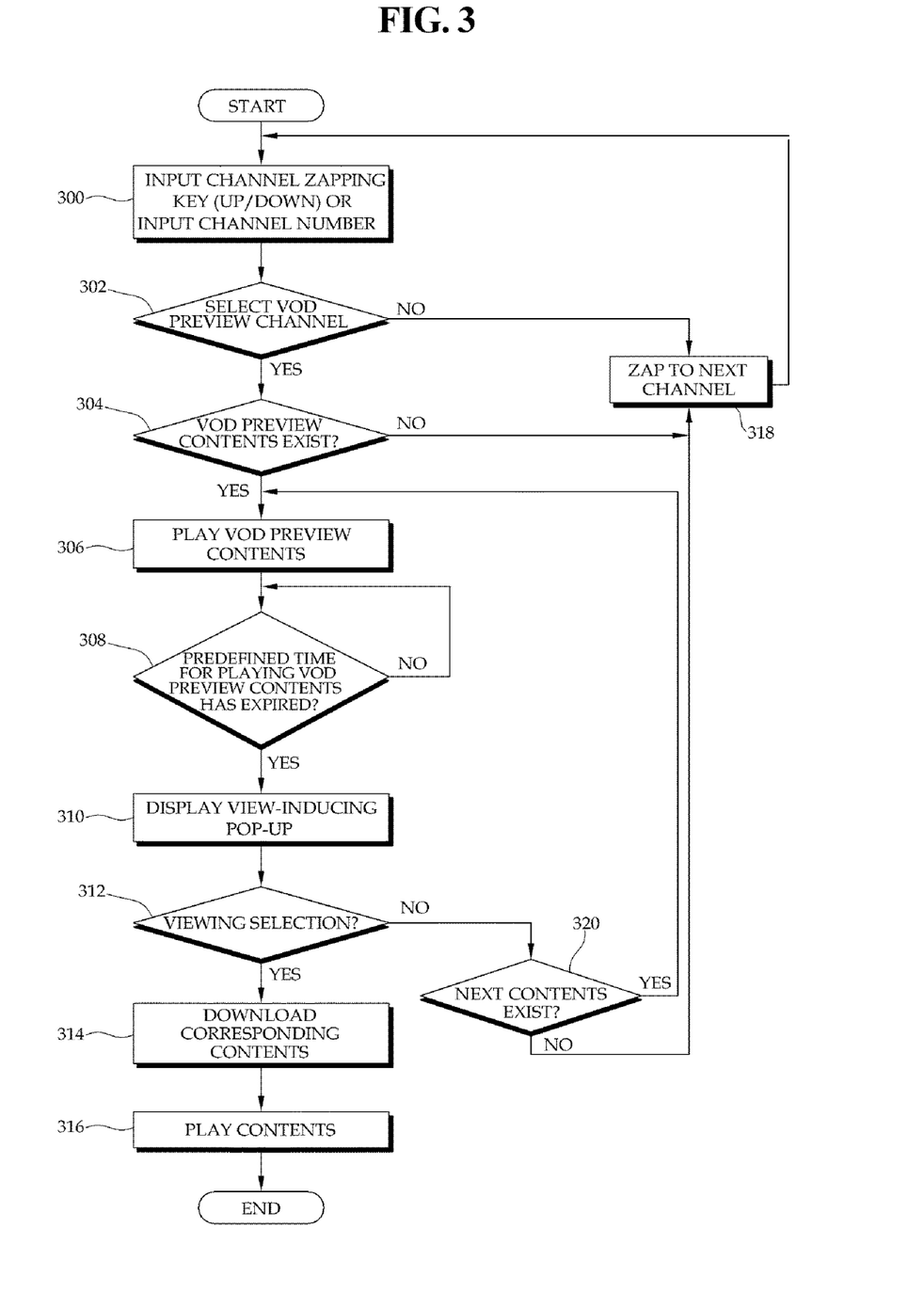
FIG. 3 shows a flowchart representing the procedure of providing a zapping preview service according to an embodiment of the present invention.

Referring to FIG. 3, if a key for channel zapping (Up/Down key) or a channel number is input in step 300, then the method proceeds to step 302 in which it is checked whether a channel selected according to the input is a VOD preview channel.

As a result of the checking, if the VOD preview channel is selected, the method proceeds to step 304. Otherwise, the method proceeds to step 318 to zaps to the next channel.

Meanwhile, if the VOD preview channel is selected, the method proceeds to step 304 to check whether there is pre-downloaded VOD preview contents corresponding to the selected VOD preview channel.

If there are pre-downloaded VOD preview contents, the method proceeds to step 306 to play the pre-downloaded VOD preview contents. But if pre-downloaded VOD preview contents do not exist, the method proceeds to step 318 to zap to the next channel.

That is, when the contents registered in the VOD preview channel do not exist pre-downloaded contents, the channel is not shown. Only when there are one or more pre-downloaded contents, the VOD preview channel, that is an input channel, is provided. According to the present invention, for a channel having no downloaded VOD preview contents, such a channel is controlled to be unseen.

In step 306, the method of playing VOD preview contents is to play one of the registered contents within the VOD preview channel randomly. An embodiment of the present invention illustrates that VOD preview content is selected and played randomly. But, the server side may determine a content playing order in advance, include the playing order information in the VOD preview information, and provide it to the set-top box 140, and the set-top box 140 may play the content according to that information.

Then, in step 308, it is checked if a predefined time for playing VOD preview contents has expired.

If the predefined time for playing VOD preview contents has expired, the method proceeds to step 310 to display a view inducing pop-up on a part of a screen. That is, when a certain time has elapsed after the VOD preview content has been viewed, a view inducing pop-up is displayed on the screen. Here, the view inducing pop-up displays a guide phrase for inducing the viewing of the original VOD contents to the played VOD preview contents; an initial viewing button which can be selected to view contents at initial time; a continued viewing button which can be selected to view the contents continuously after the preview portion, that is, right after the play has finished; and a cancel button.

Also, the cancel button refers to a button for playing the next VOD preview contents or zapping to the next channel.

Depending on a setting, both of the initial viewing button and the continued viewing buttons can be included or either one of them can be included. Meanwhile, if a user inputs the channel zapping key before the play of VOD preview contents is finished, it zaps to the channel according to the key input.

Then, if there is a selection for viewing from a user in step 312, the method proceeds to step 314 to download VOD contents about the played VOD preview contents and then plays the contents in step 316. In the viewing selection, if a user selects the initial viewing, the downloaded content is played from the start. And if the continued viewing is selected, the downloaded content is played after the pre-downloaded and played portion, that is, from the time when the play of the current VOD preview contents has finished. That is, a user confirms a view inducing pop-up displayed on the screen while watching VOD preview contents where some portion of VOD contents is compiled. Thereafter, when the user makes any viewing selection for watching (an initial viewing selection or a continued viewing selection), the user can view the original VOD contents to the VOD preview contents at initial time or continuously.

Also, if there is no specific selection for a certain time after the view inducing pop-up is provided or if the cancel key is input in step 312, it is determined that there is no selection for viewing and then the method proceeds to step 320.

In step 320, it is checked whether there are other pre-downloaded VOD preview contents corresponding to the selected VOD preview channel.

If there is another VOD preview contents, the method proceeds to step 306 to play the VOD preview contents in a random way. If there is no other VOD preview contents, the method proceeds to step 318 to zap into the next channel.

As described above, the present invention can zap between a real-time channel and a VOD preview channel by including the VOD preview channel between real-time channels and using a channel zapping key(up/down key). In another embodiment, a VOD preview channel can be directly selected according to the input of a channel number.

Hereinafter, the display of a screen when entering a VOD channel will be described with reference to exemplary screens of FIGS. 5a through 5d.

Figure 5A:
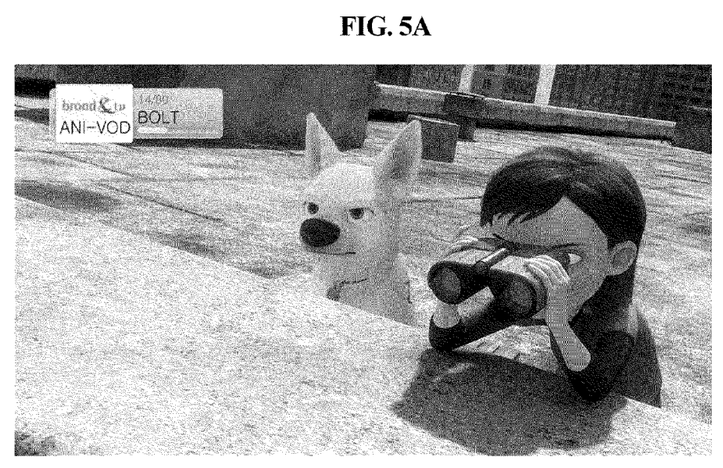
FIGS. 5a through 5d show exemplary screens of displaying a zapping preview service according to an embodiment of the present invention.

First, when entering the VOD channel by a channel zapping input, a content selected in a random way of pre-downloaded contents corresponding to the channel is played as shown in FIG. 5a, that is, it is displayed on a displaying screen. An icon representing the genre of the VOD channel referenced as ① is displayed on the displaying screen.

Figure 5B:
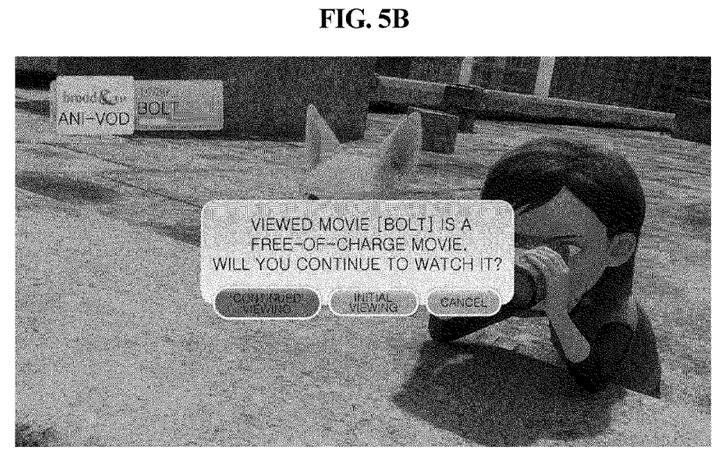

Next, when a predefined time has elapsed after the VOD preview content is played, a screen as in FIG. 5b is displayed. Referring to FIG. 5b, a screen stopped at the last screen state is displayed as the background image of the screen, a view inducing pop-up referenced as ① where a user can select the viewing of a corresponding content is displayed, and a continued viewing selection key referenced as ②, an initial viewing selection key referenced as ③ and a cancel key referenced as ④ are also displayed in the view inducing pop-up.

When a user selects the continued viewing referenced as ②, a continued viewing is played right after the corresponding content is downloaded. When an initial viewing referenced as ③ is selected, the initial part of the content is played right after the corresponding content is downloaded. And when the cancel referenced as ④ is selected, next contents are played in a random way, or the operation procedure moves to the next channel if there is no next content.

If a user does not select any above-mentioned keys during a predefined time, the pop-up disappears automatically and next contents are played in a random way, or the operation procedure moves to the next channel if there is no next content.

Figure 5C:
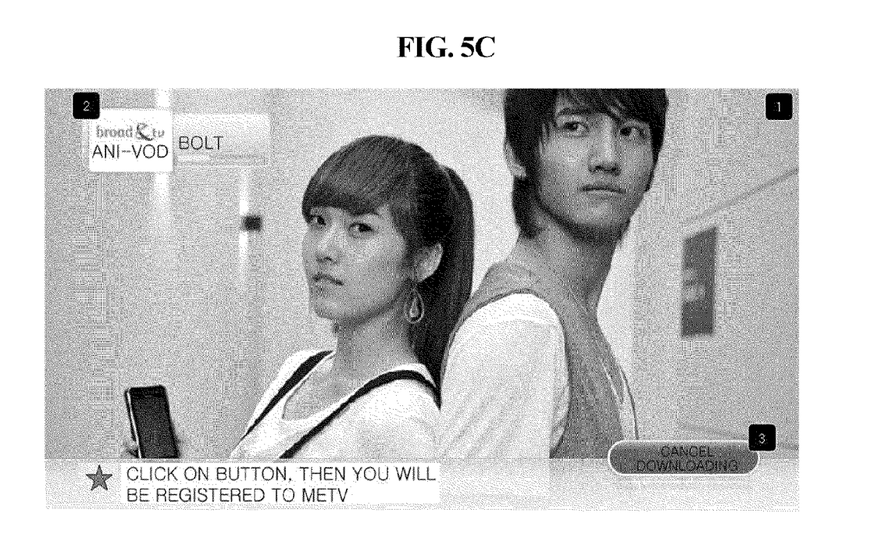

If a continued viewing or an initial viewing is selected in the screen of FIG. 5b, a screen for downloading the corresponding contents can be shown as FIG. 5c.

Referring to FIG. 5c, an advertisement image referenced as ① can be played during the download. The method of playing an advertisement image on a screen is only an embodiment of the present invention, and it goes without saying that other images can be displayed depending on settings.

Also, in the case of selecting a continued viewing, it is indicated that the parts which are after a viewing are downloaded. In the case of selecting an initial viewing, an initial part is downloaded, and download status information referenced as ② is displayed on the screen. And a download cancel key referenced as ③ for cancelling a download is displayed. If a user inputs a download cancel key, the download is cancelled, and next contents are played in a random way or the operation procedure moves to the next channel.

Figure 5D:
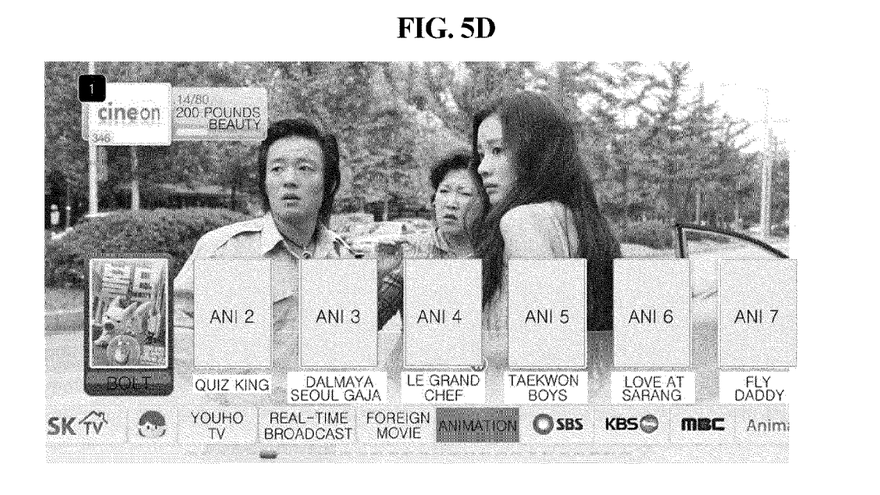

Next, referring to FIG. 5d, when moving to the next channel after completing the viewing of a VOD, next channel information is displayed on a part of the screen as shown in ① of FIG. 5d, and a next channel screen is displayed. At this time, a menu bar for offering a VOD choice to the user is displayed on the screen, wherein the menu bar displays menus in the genre of the previously watched VOD, focusing on the corresponding content. The menu bar is displayed for a predefined time (for example, displayed for 5 seconds) and then disappears.

In addition to the embodiment of the present invention as described above, VOD services can be provided through a separate VOD service selection. Thus, a user can watch a VOD through channel zapping, or by conversion to a VOD service mode and then selection of a menu, according to his conveniences.

The present invention enables selection between a real-time channel and a VOD service channel through channel zapping, so that the present invention can more conveniently provide contents, a use right of which the user has, according to the user's passive TV watching habit.

Hence, a user can make a choice of receiving a VOD service more easily and recognize/view the VOD as if it were a real-time channel.

Also, the user can receive a VOD service through inputting a VOD preview channel number using a channel up/down button or a number key, where a real-time broadcast and the VOD are naturally connected, so that the user can easily access the VOD service even though he is not a VOD mania.

Due to the increased accessibility, the VOD watching frequency of a user can increase, and also it can contribute to a user's forming an intimacy with the VOD.

The present invention can provide comprehensive contents and various forms of TV utilizations through a combination of a real-time channel and a VOD preview channel, escaping a boundary that a CATV presents only limited contents because of a channel number limit and time constraints.

Also, in the case of conventional CATVs, when a broadcast for a certain program is started and a user selects the corresponding channel, the user cannot watch that program at an initial part but merely can view from the part which is broadcast at the time of selecting the channel. However, a VOD preview channel according to the present invention may provide such functions as an initial viewing, a continued viewing, etc.

for the corresponding VOD so as to increase user's conveniences.

Although an embodiment of the present invention has been described with reference to the accompanying drawings, those skilled in the art will appreciate that various modifications, additions and substitutions are possible, without departing from the scope and spirit of the invention as disclosed in the accompanying claims. For example, it is apparent that the operation and construction of the embodiment of the present invention are applicable to any systems that provide a real-time broadcast and a VOD such as a cable and an IPTV service.

The described embodiments are intended to allow those skilled in the art to understand fully the scope of the present invention. Therefore, those embodiments should be appreciated as illustrative in all aspects, not as constrictive, and the present invention is merely defined as claimed in the appended claims.

What is claimed is:

1. A system of providing a VOD (Video On Demand) preview channel through channel zapping in a real-time broadcast service, comprising:
 a set-top box for providing a real-time channel or the VOD preview channel according to channel zapping,
 a content management server (CMS) for assigning a plurality of VOD preview channels between real-time channels and registering and managing VOD preview channel information and at least one VOD content information contained in the VOD preview channel, the plurality of VOD preview channels providing VOD previews;
 a VOD preview information providing server for providing the VOD preview information to the set-top box;
 wherein the VOD preview channel plays the original VOD contents to VOD preview contents if there is a viewing selection from a user during playing VOD preview contents for VOD contents allocated to the channels, and the VOD preview content is a content where some portion of the original VOD content is compiled; and wherein the set-top box zaps to the next channel if there is no VOD preview content because a VOD preview content corresponding to the selected VOD preview channel has not been downloaded in advance.

2. The system of claim 1, wherein the set-top box provides a real-time channel o the VOD preview channel according to the input of a channel number or a selection of menus.

3. The system of claim 1, wherein the VOD preview channels are classified according to a genre or a theme, and each of the VOD preview channels classified according to the genre or the theme is placed behind a similar kind of real-time broadcast channel.

4. The system of claim 1, wherein the set-top box plays a download VOD preview content if one VOD preview content corresponding to the selected VOD preview channel has been downloaded, and the set-top box selects and plays one VOD preview content in a random way if two or more of them have been downloaded.

5. The system of claim 1, wherein the set-top box plays only the VOD preview content which is not limited by viewing restriction when playing the VOD preview contents.

6. The system of claim 1, wherein the set-top box plays the VOD preview contents for a predefined time, displays a view inducing pop-up for inducing a viewing on a part of a screen when the predefined time has expired, and downloads and plays the original VOD contents to the played VOD preview contents if there is a viewing selection from a user.

7. The system of claim 6, wherein the view inducing pop-up displays at least one of an initial viewing button for viewing from first sees, a continued viewing button displayed with a guide phrase for inducing continuous viewing of the played VOD preview contents and a cancel button.

8. The system of claim 7, wherein the set-top box downloads the original VOD contents to the played VOD preview contents and played it at initial time when the initial viewing is selected from the displayed view inducing pop-up, and the set-top box downloads the original VOD contents to the played VOD preview contents and plays it continuously from the play finished time when a continuous viewing is selected.

9. The system of claim 7, wherein, if a cancel button is input after the view inducing pop-up is displayed or if there is no selection within a predefined time, the set-top box checks whether there are other pre-downloaded VOD preview contents corresponding to the selected VOD preview channel, and, if there are other pre-downloaded VOD preview contents, the set-top box plays the VOD preview contents according to the contents playing method.

10. The system of claim 9, wherein the set-top box zaps to the next channel when there is no pre-downloaded VOD preview content as a result of checking on whether there are other pre-downloaded VOD preview contents corresponding to the selected VOD preview channel.

11. The system of claim 1, wherein the VOD preview channel information includes at least one of: the number and the name of a channel used as a VOD preview channel in real-time channels; VOD content information of each channel; the number of contents within a channel; the start date and the end date of the channel; the start time and the end time of the channel; a channel image; a channel viewing rate; use or non-use of the channel number; use or non-use of the channel name; respective channel genre information; and CUG information.

12. The system of claim 1, wherein the VOD content information includes at least one of: contents ID information; the name of contents; the start date and the end date of contents; the start time and the end time of contents; a content poster; a contents viewing rate (a viewing age restricting rate); the start time of contents downloading; scenario settings; the start time-point and the end time-point of contents downloading; genres; contents detail information; a content director; a content actor/actress; content series information; the running time of contents; a content image; a content sound; a content price; a content broadcast date; a content evaluation mark; and CUG information.

13. A method of providing a VOD (Video On Demand) preview channel through channel zapping in a real-time broadcast service, comprising the steps of:
 (1) pre-downloading VOD preview contents using VOD preview channel information and VOD preview information including at least one VOD (Video On Demand) content information contained in the VOD preview channel;
 (2) checking whether a selected channel according to a key input from a user for channel zapping is a VOD preview channel;
 (3) checking whether there is a pre-downloaded VOD preview content which corresponds to the selected channel or not, when the selected channel is a VOD preview channel as the checking result of the second step;
 (4) zapping to the next channel if there is no pre-downloaded VOD preview content; and
 (5) playing the corresponding VOD preview content and displaying it on a screen if there is a pre-downloaded VOD preview content which corresponds to the selected channel.

14. The method of claim 13, further comprising the step of, after performing the step (2), displaying the selected real-time broadcast channel on the screen if the selected channel is a real-time broadcast channel.

15. The method of claim 13, wherein, in step (4), one of the pre-downloaded VOD preview contents is selected in a random way and played, and is then displayed on the screen.

16. The method of claim 13, wherein, in step (4), only a viewing-unrestricted VOD preview content is played when the VOD preview content exists and is played.

17. The method of claim 13, further comprising the steps of:
 (5) playing the VOD preview contents for a predefined time and displaying a view inducing pop-up for inducing a viewing on a part of the screen when the predefined time has expired; and
 (6) downloading and playing the original VOD contents to the played VOD preview contents if there is a viewing selection from a user.

18. The method of claim 17, wherein the view inducing pop-up displays at least one of an initial viewing button for viewing from first sees, a continued viewing button displayed with a guide phrase for inducing continuous viewing of the played VOD preview contents and a cancel button.

19. The method of claim 18, further comprising the step of:
 (7) downloading the original VOD contents to the played VOD preview contents and played it at initial time when an initial viewing is selected from the displayed view inducing pop-up, and, when a continuous viewing is selected, the set-top box downloads the original VOD contents to the played VOD preview contents and playing it continuously from the play finished time.

20. The method of claim 18, further comprising the steps of:
 (8) checking whether there are other pre-downloaded VOD preview contents corresponding to the selected VOD preview channel if a cancel button is input after the view inducing pop-up is displayed, or there is no selection within a predefined time; and (9) playing the VOD preview contents according to the contents playing method if there are other pre-downloaded VOD preview contents.

21. The method of claim 20, further comprising the step of:
(10) zapping to the next channel if there is no pre-downloaded VOD preview content, after performing step (8).

22. The method of claim 13, wherein the VOD preview channel information includes at least one of: the number and the name of a channel used as a VOD preview channel in real-time channels; VOD content information of each channel; the number of contents within a channel; the start date and the end date of the channel; the start time and the end time of the channel; a channel image; a channel viewing rate; use or non-use of the channel number; use or non-use of the channel name; respective channel genre information; and CUG information.

23. The method of claim 13, wherein VOD content information includes at least one of: contents ID information; the name of contents; and the start date and the end date of contents; the start time and the end time of contents; a content poster; a contents viewing rate (a viewing age restricting rate); the start time of contents downloading; scenario settings; the start time-point and the end time-point of contents downloading; genres; contents detail information; a content director; a content actor/actress; content series information; the running time of contents; a content image; a content sound; content price; a content broadcast date; a content evaluation mark; and CUG information.

\* \* \* \* \*